(12) United States Patent
Cordeiro et al.

(10) Patent No.: US 8,873,470 B2
(45) Date of Patent: Oct. 28, 2014

(54) METHOD OF RECOVERING COMMUNICATION ACCESS IN DYNAMIC SPECTRUM ACCESS WIRELESS SYSTEMS

(75) Inventors: Carlos Cordeiro, Ossining, NY (US); Kiran Challapali, New City, NY (US)

(73) Assignee: Koninklijke Philips N.V., Eindhoven (NL)

(*) Notice: Subject to any disclaimer, the term of this patent is extended or adjusted under 35 U.S.C. 154(b) by 1643 days.

(21) Appl. No.: 12/066,867

(22) PCT Filed: Sep. 14, 2006

(86) PCT No.: PCT/IB2006/053297
§ 371 (c)(1),
(2), (4) Date: Mar. 14, 2008

(87) PCT Pub. No.: WO2007/031961
PCT Pub. Date: Mar. 22, 2007

(65) Prior Publication Data
US 2009/0040986 A1 Feb. 12, 2009

Related U.S. Application Data

(60) Provisional application No. 60/718,127, filed on Sep. 16, 2005, provisional application No. 60/733,519, filed on Nov. 4, 2005.

(51) Int. Cl.
*H04W 4/00* (2009.01)
*H04L 1/22* (2006.01)
*H04W 16/06* (2009.01)
*H04W 72/04* (2009.01)
*H04L 5/06* (2006.01)
*H04W 76/02* (2009.01)
*H04W 74/00* (2009.01)
*H04W 84/12* (2009.01)

(52) U.S. Cl.
CPC ............ *H04W 72/0406* (2013.01); *H04L 1/22* (2013.01); *H04W 16/06* (2013.01); *H04W 76/02* (2013.01); *H04W 74/00* (2013.01); *H04W 84/12* (2013.01); *H04L 5/06* (2013.01)
USPC ............ 370/329; 370/252; 370/338; 370/450

(58) Field of Classification Search
None
See application file for complete search history.

(56) References Cited

U.S. PATENT DOCUMENTS

| 2002/0186749 A1* | 12/2002 | Jones ............................ 375/132 |
| 2003/0171116 A1* | 9/2003 | Soomro ........................ 455/434 |
| 2003/0206130 A1 | 11/2003 | Husted |
| 2004/0233888 A1* | 11/2004 | Bonta et al. .................. 370/350 |
| 2004/0248568 A1 | 12/2004 | Lucidarme |
| 2005/0201331 A1* | 9/2005 | Gaal et al. ..................... 370/332 |

FOREIGN PATENT DOCUMENTS

| EP | 1473956 A2 | 11/2004 |
| WO | WO03001742 A1 | 1/2003 |
| WO | WO2004070988 A2 | 8/2004 |

OTHER PUBLICATIONS

Carlos Cordeiro et al., "IEEE 802.22: The First Worldwide Standard based on Cognitive Radios", New Frontiers in Dynamics Spectrum Access Networks, 2005, DTSPAN 2005, First IEEE Int'l Symposium on Balitmore, ND, USA, Nov. 2005, IEEE, Nov. 8, 2005, pp. 328-337, XP010855130.

(Continued)

*Primary Examiner* — Jackie Zuniga Abad
(74) *Attorney, Agent, or Firm* — Larry Liberchuk

(57) ABSTRACT

A wireless system and method including a medium access control (MAC) layer adapted to recover service in restricted channels.

20 Claims, 3 Drawing Sheets

(56) References Cited

OTHER PUBLICATIONS

Carlos Cordeiro et al, "Cognitive PHY and MAC Layers for Dunamic Spectrum Access and Sharing of TV Bands", Online, XP002422381, URL:http://www.wtapas.org/final-papers/Cordeiro-TAPAS06-Session-II-1.pdf, Aug. 2006.

Internet Citation, "Functional Requirements for the 802.22 WRAN Standard", Aug. 2005, XP002425031 URL:www.ieee802.org/22/Meeting_documents/2005_Aug_teleconferences/22-05-007-39-0000_RAN_Requirements.doc.

* cited by examiner

METHOD OF RECOVERING COMMUNICATION ACCESS IN DYNAMIC SPECTRUM ACCESS WIRELESS SYSTEMS

CROSS-REFERENCE TO RELATED APPLICATIONS

The present application is related to concurrently filed and commonly assigned U.S. patent applications having Ser. No. 12/066,853, now U.S. Pat. No. 8,175,046, issued May 8, 2012; Ser. No. 12/066,878, now U.S. Pat. No. 8,233,444, issued Jul. 31, 2012; and Ser. No. 12/066,887, filed Mar. 14, 2008.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

As can be appreciated, in order for a secondary device to vacate a channel when an incumbent device begins occupying the channel, the secondary devices must be provided notice of the need to vacate the channel. However, in DSA wireless networks, one or more of the secondary devices may not receive the notification due to interference or other factors. Moreover, there may be a delay in channel availability. Accordingly, the affected secondary device(s) may be delayed, if not precluded, from recovering or resuming service in another channel. As a result, the requirement that a secondary device vacate a channel occupied by an incumbent may be violated, or the quality of service (QoS) provided to the secondary device may be reduced, or both.

What is needed, therefore, is a method of recovery by secondary devices upon notification of occupation by incumbent devices that overcomes at least the shortcomings noted above.

In accordance with an example embodiment, a wireless communication network, a method of wireless communication includes determining a backup channel from a plurality of restricted channels. The method also includes notifying a plurality of wireless stations (STAs) in the wireless communication network of the backup channel.

In accordance with another example embodiment, in a wireless communication system, a method of wireless communication includes transmitting information from wireless stations (STAs) to a base station, wherein the information indicates the operation or absence of operation of an incumbent device in a restricted frequency channel. In addition, based on the information, the method includes transmitting a command to the STAs of the wireless communication system.

In accordance with yet another example embodiment, a wireless communication system includes a base station (BS) adapted to assign a backup channel. The system also includes a plurality of wireless communication stations (STAs) adapted to transmit information indicating restricted channels occupied by incumbent device and restricted channels not occupied by incumbent devices to the BS, wherein the ES determines the backup channel from the information.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
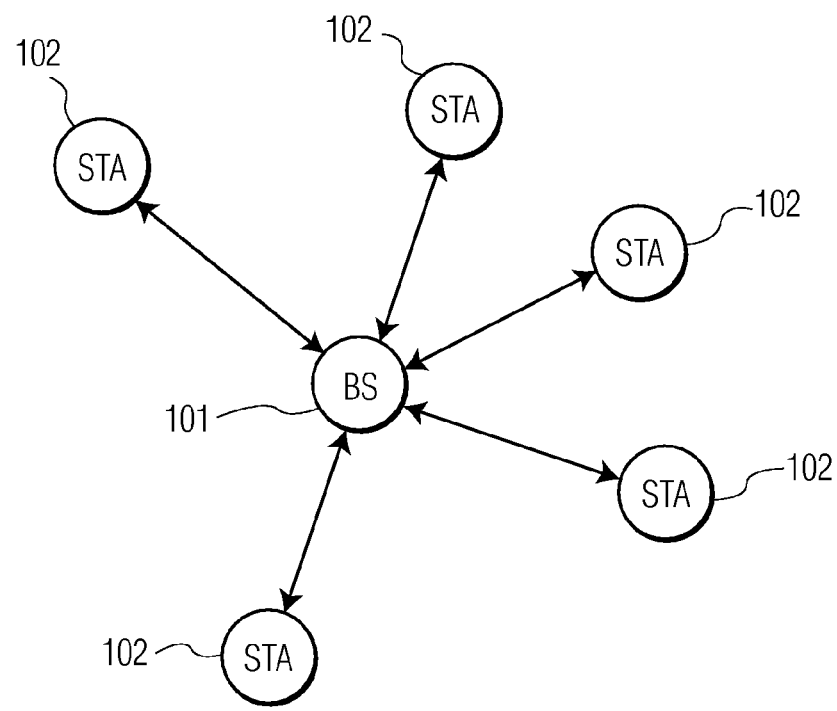
FIG. 1 is a simplified schematic diagram of a wireless communication system in accordance with an example embodiment.

As used herein the term 'restricted frequency channel' or 'restricted channel' means a frequency channel dedicated for use by primary users. The restricted channels may be portions of the communications spectrum that is licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum. Thus, certain unlicensed channels that are restricted channels are contemplated as restricted channels. In addition, so-called licensed-exempt channels, which provide priority access to certain users, are also restricted channels.

As used herein, the terms 'a' and 'an' mean one or more; and the term 'plurality' means two or more.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, or IEEE 802.15. Moreover, the network may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

FIG. 1 is a simplified schematic view of a wireless network 100 in accordance with an illustrative embodiment. In a specific embodiment, the wireless network 100 is a centralized network. However, the present teachings may be generalized to a distributed wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE).

Illustratively, the wireless network 100 may be one of the types of networks noted previously. Moreover, the STAS 102 may be computers, mobile telephones, personal digital assistants (PDA), or similar device that typically operates in such networks. In a specific embodiment, at least one of the STAs 102 is stationary. It is contemplated that the STAs 102 are adapted to function in restricted frequency channels of a frequency band that requires protection of incumbent users. As such, the BS 101 and the STAs 102 are secondary devices and the network 100 is a secondary network. Often, for simplicity restricted frequency channels and restricted channels may be referred to as 'channels.'

It is noted that only a few STAs 102 are shown; this is merely for simplicity of discussion. Clearly, many other STAs 102 may be used. Finally, it is noted that the STAs 102 are not necessarily the same. In fact, a plethora of different types of STAs adapted to function under the chosen protocol may be used within the network 100.

The DSA MAC layer methods and apparati of the example embodiments may be implemented in dynamic environments where the availability and quality of channels vary over time (e.g., new wireless technologies designed for the TV bands). Thus, the network of secondary STAs 102 of the example embodiments beneficially obtain channel availability in a dynamic manner; and beneficially notify other secondary STAs 102 and the BS 101 of the occupation or future occupation of a channel by an incumbent device.

Figure 2:
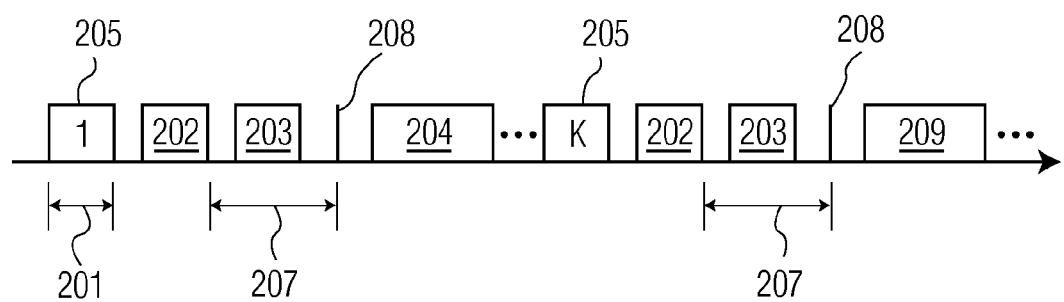
FIG. 2 is a timing diagram of data communication in accordance with an example embodiment.

FIG. 2 is a timing diagram in accordance with an example embodiment. The description of FIG. 2 is more clearly understood when reviewed concurrently with FIG. 1. In the illustrative centralized wireless system, the BS 101 MAC layer functions regulate both downstream (DS) and upstream (US) medium access. Because the system 100 is adapted to function coexistently with incumbent devices in restricted frequency channels, the BS 101 and the STAs 102 of the system 100 continuously or periodically monitor/measure certain parameters in order to detect the presence of an incumbent device in those frequency bands/channels that are being directly affected by the transmissions of the BS 101 and STAs 102 belonging to the secondary network 100. According to the example embodiments, the STAs 102 are adapted to notify the BS 101 of its network that an incumbent user has started to operate in a given restricted frequency band.

During a superframe, a plurality (n) of quiet periods 205 each having a duration 201 are provided for measuring the affected channels by the devices secondary network 100. These measurements are made in the restricted channel or band of operation and are referred to as in-band measurements. Notably, the quiet periods are not needed if the measurement is to be done in channels not directly affected by the secondary wireless network. These measurements are referred to as out-of-band measurements.

During each quiet period 205, the STAs 102 do not transmit data frames, but rather make in-band measurements and garner data from the affected frequency channels. The data may include received signal strength of incumbent devices occupying a channel, the confidence with which the measurement was made, the channel(s) measured, the estimated location of the incumbent user, the measurement duration, and so on. These data are processed via algorithms within the physical (PHY) and MAC layers of the STAs 102 for later use.

After the data are garnered and processed, a US notification period 202 begins. During the US notification period 202, the STAs 102 that have acquired data regarding incumbent devices may provide the information to the BS 101. Based on this information, the BS 101 may take action in later downstream (DS) communications with the STAs 102 that report the information.

After completion of the notification period, a recovery period 203 begins. As described more fully herein, during the recovery period 203, the BS 101 may issue spectrum management commands to the STAs 102. Beneficially, the spectrum management commands coordinate the functions of the STAs 102 in the network. Illustratively, the spectrum management commands may instruct the STAs 102 to cease operation in one channel(s) and commence operation in another channel(s) and/or reduce transmit power levels. Furthermore, based on the information garnered by the BS 101 during past out-of-band measurements or the US notification periods 202, the BS 101 may identify one or more backup channels for the STAs 102. Then, the BS 101 may communicate the backup channel(s) information to all STAs 102 during beacon transmissions or other DS traffic. Among other benefits, the backup channel(s) are useful in circumstances where an STA 102 does not receive the instruction to switch channels due to the occupation by an incumbent of the channel currently used by the STA 102.

After the termination of the recovery period 203, a communication period 204 begins. The communication period 204 includes US and DS traffic between the STAs 102 and the BS 101 according to the known wireless protocols referenced previously. During communication periods 204, the STAs 102 perform out-of-band measurements and in-band measurements. The measurements are performed to ensure rapid vacating of a frequency channel/band in the event that an incumbent device begins operation in the channel/band; and to inform the BS 101 and the STAs 102 of available channel(s) and backup channel(s). The former provides protection of incumbent devices; and the latter helps provide uninterrupted operation of the wireless network 100 whenever an incumbent is detected in-band.

If, as a result of the information garnered by the BS 101 it determines that one or more STAs 102 must vacate their present channel, the BS 101 will issue spectrum management commands instructing the affected STAs to begin operation in a vacant channel. After receiving the commands, the affected STAs begin normal operation during the communication period 204.

If one or more STAs 102 has not received spectrum management commands from the BS 101 during the recovery period 204, the example embodiments contemplate certain actions useful in protecting the incumbent service as well as fostering acceptable QoS levels in the wireless network 100. In one example embodiment, each STA 102 commences an internal timer at the termination of the notification period 202. The timer continues for a predetermined duration 207, and terminates at time 208. If, by time 208, an STA 102 has not received any information from the BS, the STA will attempt to occupy the backup channel(s) previously selected by the BS 101 and transmitted to the STAs 102 during a beacon period, or a previous channel command. However, if the backup channel(s) is occupied, the affected STA(s) 102 function according to embodiments described herein.

During another frame (the kth frame), the STAs 102 make measurements during the quiet period 205. Thereafter, the US notification period 202 begins with the STAs providing US measurements. After the notification period 202, the BS 101 commences transmission of spectrum management commands during the recovery period 203.

If, as a result of the information gathered during the notification period 202, the BS 101 determines that there are no available channels in which the STAs 102 may operate, the BS 101 must instruct the STAs 102 to terminate operation. During this period 209, the STAs 102 will terminate transmissions and thus avoid interfering with the incumbent devices now occupying their channels. Alternatively, STAs 102 that do not receive an enabling transmission from the BS 101 during a predetermined amount of time must cease any transmission. However, the STAs 102 will continue to monitor the channels, both in-band and out-of-band.

If a particular STA 102 determines from the measurements taken during period 209 that a channel/band is available, and the particular STA 102 that reported in a previous US notification period 202 that this channel was occupied, this STA 102 may begin transmission in this channel and report to the BS 101 that the channel is now available. Thereafter, the BS 101 will initiate operation through this newly available channel, which includes beacon transmissions indicating that the channel is now available for use by the wireless network. STAs 102 that tune and synchronize to this channel and receive the spectrum management command to begin service from the BS 101 can resume their normal operation (not shown).

Beneficially, the MAC protocol of the example embodiments provides for backup channel(s) maintained by the BS 101 and the STAs 102 during operation. Moreover, in the event that one or more STAs 102 do not receive the spectrum management command during the recovery, these STAs may search the backup channel(s) for occupation by the BS 101. This way, the recovery procedure may avoid significant interruption in service, as both the BS 101 and STAs 102 are aware of possible channels where service may be recovered should an incumbent initiate operation in their channel.

To maximize the utility of the backup channel(s), the channels are selected independently from the current operational channel(s). This way, the likelihood that the backup channel(s) is also affected when the incumbent service initiates operation in the operational channel can be significantly minimized. In summary, for the support of backup channel(s) the MAC could specify: channel numbers for backup; or a bitmap of backup channels in the beacons broadcast during frames or superframes; or during the recovery period via a spectrum management command, or both.

Figure 3:
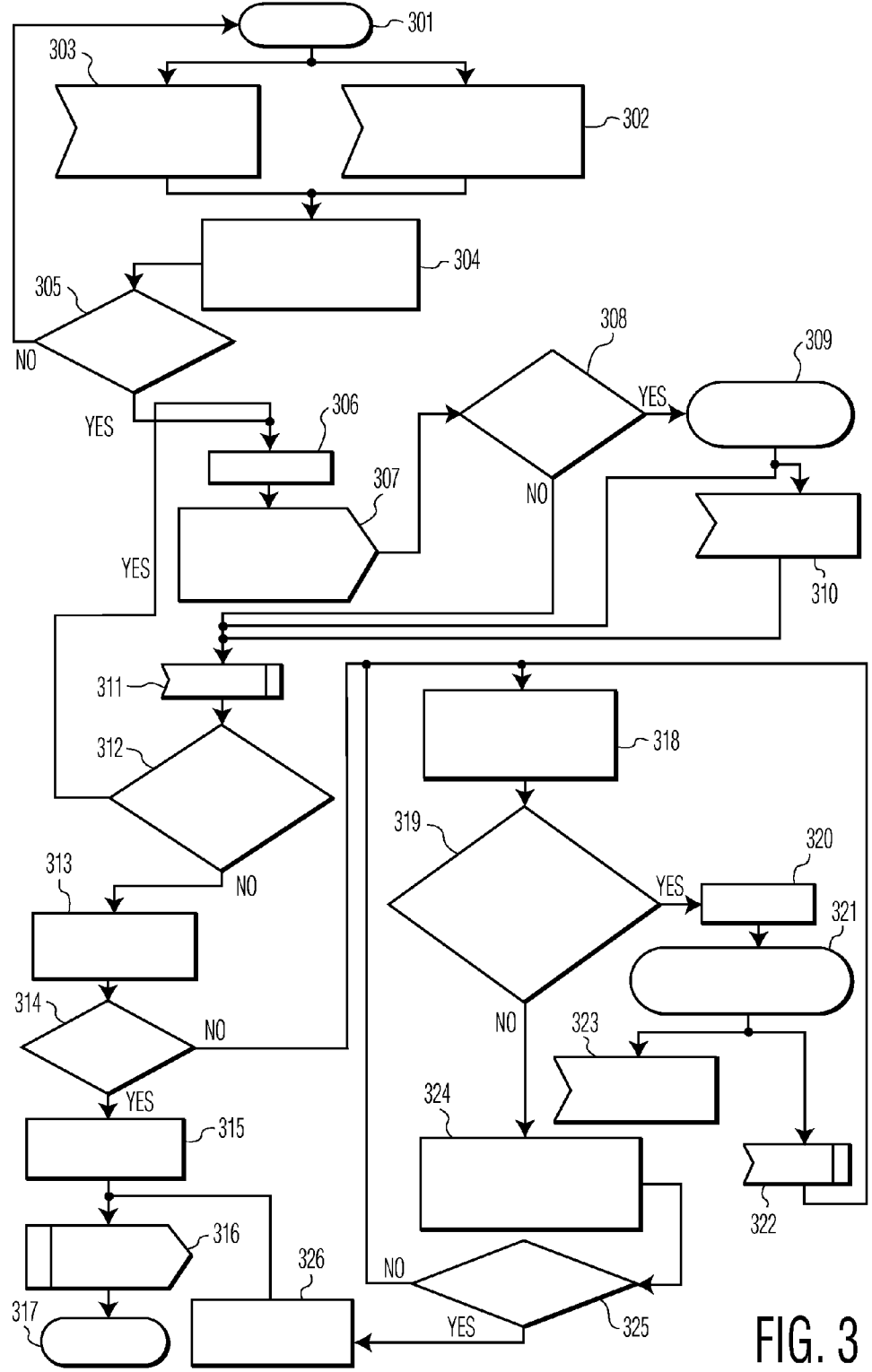
FIG. 3 is a simplified flow-chart of a method of wireless communication in accordance with an example embodiment.

FIG. 3 is a simplified flow-chart of an incumbent detection recovery protocol (IDRP) executed at the BS 101 in accordance with an example embodiment. The description of FIG. 3 is more clearly understood when reviewed concurrently with FIGS. 1 and 2. In the illustrative centralized wireless system, the MAC layer of the BS 101 functions to regulate DS and US communications including the IDRP described presently.

At step 301, the wireless network is operational. At step 302, the BS 101 receives notice from one or more STAs (CPES) 102 that an incumbent device is operating in an in-band channel(s) N. This notification normally occurs in the notification period 202, described previously. Alternatively, the BS 101 may itself detect the existence of the incumbent directly at step 303. Regardless of the notification mechanism, at step 304, the channel information, including the backup channel information is updated. If, at step 305 the channel N is an in-band channel a timer is set at step 306 so that the BS 101 can wait for further notifications from other STAB 102 to confirm the detection of the incumbent. Based on the reliability of the information regarding the incumbent, the BS 101 may take certain action. For example, if no other (or very few) STAB 102 report the presence of the incumbent during this time, the BS 101 may decide to delay taking corrective actions. However, if other STAB 102 indicate the presence of the incumbent, the BS 101 will take prompt action.

At step 307, the BS 101 transmits a spectrum management command to the STAB 102 during the recovery period 203. The spectrum management command may include information on backup channel(s), commands for STAB 102 to switch operation to channels not currently occupied by incumbent devices, or commands for STAB 102 to reduce transmit power levels.

The method may require a confirmation of receipt of the command at step 308. If so, at step 309 the BS 101 waits a set period of time for receipt of the command. If the confirmation is received at step 310, the process continues at step 310 with a timeout. Notably, the method continues directly to the timeout 311 if the confirmation is not required. Also, because this sequence is completed and there is no need to attempt again at this point, a Retries field, which is used at step 312, is set to 0 (zero).

If, however the confirmation is not received and time remains in the recovery period 203 for notification and additional attempts to provide the spectrum management command, the method repeats beginning at step 304. If time does not remain or Retries are less than or equal to 0 (zero), at step 313, during the recovery period 203, the BS 101 and STAs 102 effects changes per the spectrum management commands. The spectrum management commands may instruct the STAs 102 to terminate operation because all channels are occupied and there is no backup channel(s) available. Alternatively, the spectrum management commands may include instructions to the STAs 102 to occupy certain available channel(s).

At step 314, the BS 101 queries if there are channels available for use as backup channel(s) in the current data frame. If so, normal operation continues at step 315. To with, communications are effected in the communications period;

and STAs 102 garner measurements of in-band and out-of-band channels/bands. The frame terminates at step 316 and the system continues operation at step 317.

If at step 314, the BS 101 determines that there are no backup channel(s) available, the method continues with the selection of a candidate channel per certain optimization criteria. For example, a reference channel may be maintained a priori by the BS 101 and STAs 102. The reference channel may be considered as a secondary backup channel. Other channels having a frequency close to the reference channel frequency are selected by the BS 101 at step 318. If such a channel is available, a rather smooth transition to this channel may be made to avoid disruption of service. To this end, the selection of the alternate channel does not require scanning the entire spectrum, but rather only channels near the reference channel.

Next, at step 319, the BS 101 scans the information garnered in the notification period 202 to determine if the selected channel was deemed by a STA 102 to be occupied by an incumbent. If notification has been made, a timer is begun at step 320 and at step 321 the BS 101 waits for notification from an STA 102 that the channel is free. If notification is not received, the BS issues a timeout 322 where operation ceases and the process repeats at step 318.

If notification of the status of the selected channel is received at step 323, the BS 101 queries at step 324 whether, from the point of view of the BS 101, an incumbent is functioning in the selected channel. At step 325, the BS 101 determines if operation in the selected channel is possible. If so, operation is initiated in the channel(s) available at step 326. If not, the process continues at step 318.

Figure 4:
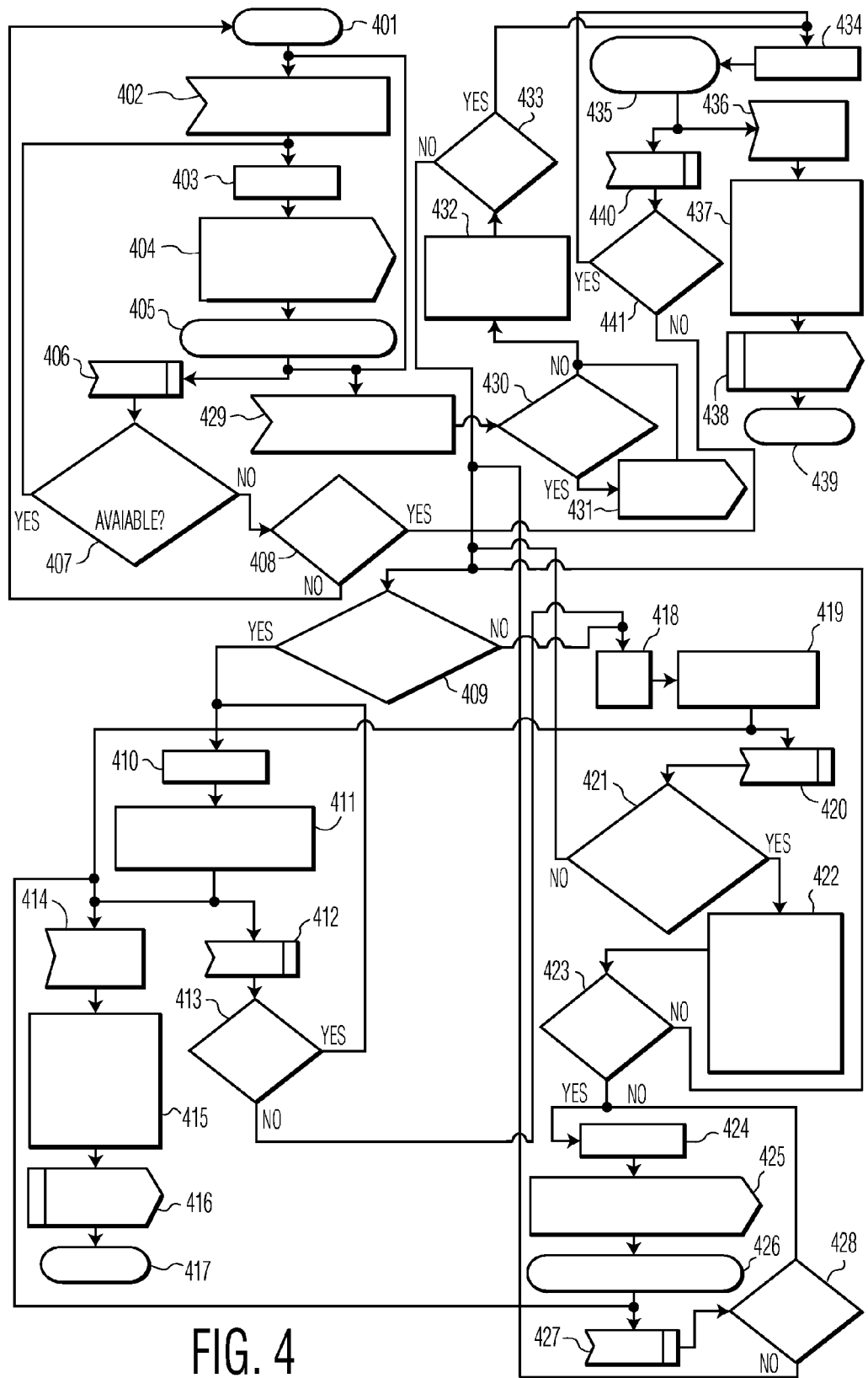
FIG. 4 is a simplified flow-chart of a method of wireless communication in accordance with an example embodiment.

FIG. 4 is a simplified flow-chart of an IDRP of an STA 102 executed in accordance with an example embodiment. The description of FIG. 4 is more clearly understood when reviewed concurrently with FIGS. 1, 2 and 3. In the illustrative centralized wireless system, the MAC layer of the STA 102 functions to effects communications and measurements including the IDRP described presently.

At step 401, the system 100 is operational. At step 402, the STA 102 detects an incumbent in channel N. Notably, this detection may be the result of in-band or out-of-band measurements as described previously. Regardless, a timer is started at step 403. The timer initiated at step 403 controls the frequency at which the STA 102 send the notification back to the BS 101. In other words, the STA 102 usefully does not send a notification message repeatedly one after the other, but rather should periodically transmit the notification so that the BS 101 has enough time to react to the notification.

At step 404, and during the notification period 202, the STA 102 attempts to transmit information to the BS 101 regarding the presence of the incumbent. The STA 102 will then wait for instructions via a spectrum management command at step 405. The STA 102 may then enter a timeout period 406 during which it refrains from transmitting. If there remains time in the notification period to retransmit the information and if retries are available (i.e., the retries field is not zero), at step 407, the STA 102 begins again at step 403. If however, the notification period expires, at step 408, the STA 102 determines if the channel (N) is an in-band channel. If not, the process begins again at step 401.

If the channel is an in-band channel, at step 409 the STA 102 determines if backup channel information was received in a previous communications from the BS 101. If so, a timer is begun at step 410. At step 411 the STA 102 scans the channels searching for the BS 101. To this end, if the STA 102 has not received the spectrum management command, the STA 102 attempts to determine which backup channel is being occupied by the BS 101 via scanning. If there is only one backup channel provided in the previous communication from the BS 101, the STA 102 will monitor this channel to determine if the BS 101 is operating in this channel.

If the known backup channel(s) is/are occupied by an incumbent device(s), the STA 102 will set a timer at step 412 and at step 413 will query if there remains time in the current frame to restart the process at step 409. If however, a BS 101 beacon is received at step 414, or if the STA 102 finds an available backup channel, the process continues at step 415 with the reestablishment of communication with the BS 101. The transaction is successful at step 416 and the system operational at step 417.

If the STA 102 does not garner a backup channel at step 409, the STA 102 will have to terminate transmissions until the BS 101 beacon is received at step 414. This may degrade the service of the STA 102, but will ensure that the STA 102 does not interfere with the incumbents operating in restricted channels.

If, at step 413 the STA 102 is not afforded the opportunity to scan channels at step 411, a timer is begun at step 418. The STA 102 will then begin to scan channels searching for the BS 101 at step 419. If the BS 101 is found through this scanning, the method continues at step 411. If the BS 101 is not found, at step 420 another timeout is taken by the STA 102. At step 421, the STA 102 again monitors channel N to determine if the incumbent remains in the channel. If the STA 102 determines that the channel remains in use, the STA 102 continues to monitor channel N to determine if the incumbent continues to occupy the channel at step 422. If the STA 102 cannot garner the existence the incumbent at step 421, the STA 102 resumes the search for a backup channel at step 409. Notably, at this step, the STA 102 searches for a backup channel(s) to account for the situation when the STA 102 missed the beacon transmissions from the BS 101 in previous attempts through the backup channel(s).

In the illustrative embodiment, if the a particular STA 102 originally transmitted the notification to the BS 101 that channel N was occupied by an incumbent at step 404, STA 102 can transmit to the BS 101 that the channel is again free. In the example embodiment, the only STA 102 that may communicated to the BS 101 of a channel N being occupied by an incumbent is permitted to report that this channel N has again become vacant. The particular STA 102 will then transmit the notification to the BS 101 on channel N. If the BS 101 is monitoring channel N, the reception of the notification that channel N is available will trigger the initiation of the transmission of a BS 101 beacon and the initiation of a superframe reestablishing communications.

If the channel N becomes free at step 423, the STA 102 starts a timer at step 424 and at step 425; the STA 102 notifies the BS 101 that the channel is free. Next, at step 426 the STA 102 waits for a beacon transmission from the BS 101. If no beacon is received, a timeout is taken at step 427 and if the STA 102 cannot reattempt the notification process beginning at step 428, the STA 102 commences at step 409 to determine if a backup channel(s) is available.

If at step 429, the STA 102 receives the spectrum management command from the BS 101, the STA 102 will transmit a confirmation at step 431 if this is required in step 430. If no confirmation is needed, the process continues at step 432. To with, the STA 102 changes the operating parameters at in compliance with the instructions from the BS 101. These changes may require the termination of transmissions in the restricted channels. At step 433, the STA 102 garners from the spectrum management command whether any channel(s) is available. If so, after starting a timer at step 434, at step 435, the STA 102 waits for a beacon from the BS 101 in this channel. If when the STA 102 changes the operating parameters as instructed by the BS 101 no channels remain available, the method continues at step 409.

If a beacon is received at step 436, communications are reestablished at step 437 and communications continue. To with, the transaction is successful at step 438 and the system operational at step 439.

If after the termination of the timer 434 and at step 435 no beacon is received a timeout is taken at step 440. If at step 441 there are no 'retries' available, the process continues at step 409. If there are 'retries' available, the method continues at step 434.

In addition to other benefits, the IDRP described in connection with FIG. 4 incorporates a mechanism to overcome the situation that may occur and which leads to an erroneous perception from the BS 101 that incumbents occupy all channels, which causes the interruption of all transmissions in a cell. As described above, the STAs 101 monitor the channels both in-band and out-of band to assist the BS 101 in notifying about a new vacant channel. This method has applicability in many cases where access to channels is based on a primary/secondary user scheme. The methods described are useful in many cases including mobile scenarios and also when the incumbent service has lower duty cycles (e.g., wireless microphones). In addition, in certain circumstances discussed above, no vacant channels are left and hence the secondary system cannot operate. To overcome this problem, the STAs continually monitor and re-evaluate the status of a channel that the STA 102 previously reported as occupied by incumbents. If this channel becomes again free in the future, the STA sends a notification to the BS 101 which periodically monitors the channels for any such incoming notification.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. A method of wireless communication in a wireless communication network comprising a base station and a plurality of wireless stations, the method comprising:
   determining in the base station a backup channel from a plurality of restricted channels, the backup channel selected independently from current operational channels, wherein the base station and the plurality of wireless stations operate using dynamic spectrum access over one or more restricted channels of the plurality of restricted channels, wherein the restricted channels are licensed for use by incumbent devices, and wherein the base station and the plurality of wireless stations are not incumbent devices;
   specifying identification information about the backup channel in the media access control (MAC) layer via a channel number or a bitmap; and
   notifying the plurality of wireless stations (STAs) in the wireless communication network of the backup channel by regularly transmitting the identification information from the base station about the backup channel.

2. The method as recited in claim 1, further comprising, after the notifying, transmitting a command to the STAs.

3. The method as recited in claim 2, wherein the command instructs the STAs to occupy backup channel.

4. The method as recited in claim 2, further comprising transmitting in-band and out-of-band measurements from at least one of the STAB to the BS during a notification period, wherein each of the STAB waits for a period of time after a termination of the notification period to receive the command.

5. The method as recited in claim 4, further comprising, transmitting the out-of-band measurements to a base station (BS).

6. The method as recited in claim 4, further comprising, transmitting the out-of-band measurements to a base station (BS).

7. The method as recited in claim 2, further comprising transmitting in-band and out-of-band measurements from at least one of the STAs to the BS during a notification period, wherein each of the STAs waits for period of time after a termination of the notification period to receive the command.

8. The method as recited in claim 7, further comprising, resuming operation in the backup channel if the command is not received in the period of time.

9. The method as recited in claim 2, wherein the command instructs the STAs to terminate transmission if no channels are available.

10. The method as recited in claim 1, further comprising, before the notifying, receiving in-band measurements at a base station (BS) from at least one of the plurality of STAs indicative of a presence or an absence of an incumbent device.

11. The method as recited in claim 1, further comprising:
    transmitting information from the wireless stations (STAs) to a base station, wherein the information indicates the operation or absence of operation of an incumbent device in a restricted frequency channel; and
    based on the information, transmitting a command to the STAs of the wireless communication network.

12. The method as recited in claim 11, wherein the transmitting of the command is effected during a recovery period.

13. The method as recited in claim 11, wherein, if all restricted channels are occupied, the command instructs the STAs to terminate transmitting data.

14. The method as recited in claim 13, wherein the STAs make measurements of in-band channels and out-of-band channels after receiving the command.

15. The method as recited in claim 14, further comprising transmitting to the BS the availability of at least one of the in-band channels or out-of-band channels.

16. A wireless communication system, comprising:
    a base station (BS) adapted to assign a backup channel; and
    a plurality of wireless communication stations (STAB) adapted to transmit information indicating restricted channels occupied by incumbent devices and restricted channels not occupied by incumbent devices to the BS,
    wherein the base station and the plurality of wireless stations operate using dynamic spectrum access over one or more restricted channels selected from a plurality of restricted channels, wherein the restricted channels are licensed for use by incumbent devices, and wherein the base station and the plurality of wireless stations are not incumbent devices,
    wherein the BS determines the backup channel from the plurality of restricted channels using the information indicating the occupied restricted channels and the not-occupied restricted channels included in the plurality of restricted channels, the backup channel being selected independently from current operational channels~ and identification information about the backup channel is specified in the media access control (MAC) layer via a channel number or a bitmap, and wherein the BS notifies the plurality of wireless stations (STAB) of the backup channel by regularly transmitting the identification information from the base station about the backup channel.

17. The wireless communication system as recited in claim 16, wherein the STAs are adapted to conduct in-band and out-of-band measurements and the information is based on the measurements.

18. The wireless communication system as recited in claim 16, wherein the BS is adapted to transmit a spectrum management command and the spectrum management command instructs the STAs to switch to the backup channel.

19. The wireless communication system as recited in claim 16, wherein the BS is adapted to transmit a spectrum management command and the spectrum management command instructs the STAs to occupy the restricted channels that are not occupied.

20. The wireless communication system as recited in claim 16, wherein the BS is adapted to transmit a spectrum management command and the spectrum management command instructs the STAs to terminate transmission.

* * * * *